(12) United States Patent
Landrum et al.

(10) Patent No.: US 8,447,802 B2
(45) Date of Patent: May 21, 2013

(54) ADDRESS MANIPULATION TO PROVIDE FOR THE USE OF NETWORK TOOLS EVEN WHEN TRANSACTION ACCELERATION IS IN USE OVER A NETWORK

(75) Inventors: Alfred Landrum, Chicago, IL (US); Kand Ly, Richmond, CA (US); Steve McCanne, Berkeley, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 0 days.

(21) Appl. No.: 11/683,325

(22) Filed: Mar. 7, 2007

(65) Prior Publication Data

US 2007/0283024 A1    Dec. 6, 2007

Related U.S. Application Data

(60) Provisional application No. 60/780,720, filed on Mar. 8, 2006.

(51) Int. Cl.
*G06F 15/16* (2006.01)

(52) U.S. Cl.
USPC ........... 709/202; 709/203; 709/227; 709/228; 709/229; 709/236; 709/238; 709/239; 709/240; 709/245

(58) Field of Classification Search
USPC ......... 709/202–203, 227–229, 236, 238–240, 709/245
See application file for complete search history.

(56) References Cited

U.S. PATENT DOCUMENTS

| | | | |
|---|---|---|---|
| 5,371,852 A | 12/1994 | Attanasio et al. | |
| 6,182,141 B1 * | 1/2001 | Blum et al. | 709/227 |
| 6,389,462 B1 * | 5/2002 | Cohen et al. | 709/218 |
| 6,415,329 B1 | 7/2002 | Gelman et al. | |
| 6,453,335 B1 * | 9/2002 | Kaufmann | 709/203 |
| 6,473,406 B1 * | 10/2002 | Coile et al. | 370/248 |
| 6,502,131 B1 * | 12/2002 | Vaid et al. | 709/224 |
| 6,631,416 B2 * | 10/2003 | Bendinelli et al. | 709/227 |
| 6,772,227 B2 * | 8/2004 | Alkhatib | 709/245 |
| 6,779,035 B1 * | 8/2004 | Gbadegesin | 709/228 |
| 6,810,417 B2 * | 10/2004 | Lee | 709/220 |
| 6,894,981 B1 * | 5/2005 | Coile et al. | 370/248 |

(Continued)

OTHER PUBLICATIONS

PCT International Search Report for PCT Appln. No. US07/63621; mailed Jul. 28, 2008 (4 pages).

(Continued)

*Primary Examiner* — Liangche A Wang
(74) *Attorney, Agent, or Firm* — Davis Wright Tremaine LLP; Philip H. Albert

(57) ABSTRACT

In address-manipulation enabled transaction accelerators, the transaction accelerators include outer-connection addressing information in packets emitted over an inner connection between transaction accelerators and inner-connection addressing information is added in packets sent over the inner connection. The inner-connection addressing information can be carried in TCP option fields, directly in other fields, or indirectly through data structures maintained by the endpoints processing the connection. Address information can be encoded into header fields originally intended for other purposes but that are unused or encoded into used fields, overlaid in combination with other data that is being carried in those used fields. The existence of inner-connection addressing information in a packet can be signaled by a flag in the packet, by a bit or other designated encoding. The flag can be in an unused header field or overlaid. Where replacement and option addition is needed, swappers and unswappers might be used.

12 Claims, 5 Drawing Sheets

U.S. PATENT DOCUMENTS

| | | | |
|---|---|---|---|
| 6,968,389 B1* | 11/2005 | Menditto et al. | 709/233 |
| 6,981,029 B1* | 12/2005 | Menditto et al. | 709/217 |
| 7,016,973 B1* | 3/2006 | Sibal et al. | 709/238 |
| 7,085,854 B2* | 8/2006 | Keane et al. | 709/250 |
| 7,120,666 B2* | 10/2006 | McCanne et al. | 709/203 |
| 7,123,613 B1* | 10/2006 | Chawla et al. | 370/389 |
| 7,126,955 B2* | 10/2006 | Nabhan et al. | 370/401 |
| 7,136,359 B1* | 11/2006 | Coile et al. | 370/248 |
| 7,149,222 B2* | 12/2006 | Wiryaman et al. | 370/401 |
| 7,161,947 B1* | 1/2007 | Desai | 370/401 |
| 7,181,542 B2* | 2/2007 | Tuomenoksa et al. | 709/250 |
| 7,225,259 B2* | 5/2007 | Ho et al. | 709/227 |
| 7,251,745 B2* | 7/2007 | Koch et al. | 714/11 |
| 7,257,837 B2* | 8/2007 | Xu et al. | 726/12 |
| 7,349,348 B1* | 3/2008 | Johnson et al. | 370/254 |
| 7,386,631 B1* | 6/2008 | Sibal et al. | 709/238 |
| 7,395,354 B2* | 7/2008 | Keane et al. | 709/245 |
| 7,428,573 B2* | 9/2008 | McCanne et al. | 709/203 |
| 7,502,836 B1* | 3/2009 | Menditto et al. | 709/217 |
| 7,583,665 B1* | 9/2009 | Duncan et al. | 370/389 |
| 7,650,416 B2* | 1/2010 | Wu et al. | 709/228 |
| 7,849,134 B2* | 12/2010 | McCanne et al. | 709/203 |
| 7,948,921 B1 | 5/2011 | Hughes et al. | |
| 7,961,727 B2* | 6/2011 | Duncan et al. | 370/389 |
| 8,069,225 B2* | 11/2011 | Mccanne et al. | 709/219 |
| 8,140,690 B2* | 3/2012 | Ly et al. | 709/228 |
| 8,146,144 B2* | 3/2012 | Jaenicke | 726/11 |
| 2002/0026503 A1* | 2/2002 | Bendinelli et al. | 709/220 |
| 2002/0056008 A1* | 5/2002 | Keane et al. | 709/245 |
| 2002/0133534 A1* | 9/2002 | Forslow | 709/200 |
| 2002/0186698 A1* | 12/2002 | Ceniza | 370/401 |
| 2003/0076819 A1* | 4/2003 | Emerson, III | 370/352 |
| 2003/0158962 A1* | 8/2003 | Keane et al. | 709/238 |
| 2003/0177221 A1* | 9/2003 | Ould-Brahim et al. | 709/223 |
| 2003/0229809 A1* | 12/2003 | Wexler et al. | 713/201 |
| 2004/0249911 A1* | 12/2004 | Alkhatib et al. | 709/223 |
| 2006/0067342 A1* | 3/2006 | Dispensa | 370/401 |
| 2006/0069719 A1* | 3/2006 | McCanne et al. | 709/203 |
| 2006/0075114 A1* | 4/2006 | Panasyuk et al. | 709/227 |
| 2006/0098645 A1* | 5/2006 | Walkin | 370/389 |
| 2006/0248194 A1* | 11/2006 | Ly et al. | 709/226 |
| 2007/0002857 A1* | 1/2007 | Maher | 370/389 |
| 2007/0006292 A1* | 1/2007 | Jaenicke | 726/11 |
| 2007/0079366 A1* | 4/2007 | Geffner | 726/12 |
| 2007/0206615 A1* | 9/2007 | Plamondon et al. | 370/401 |
| 2008/0133774 A1* | 6/2008 | Rhee | 709/246 |
| 2008/0222304 A1* | 9/2008 | Sibal et al. | 709/238 |
| 2008/0320106 A1* | 12/2008 | McCanne et al. | 709/219 |
| 2008/0320151 A1* | 12/2008 | McCanne et al. | 709/228 |
| 2009/0094371 A1* | 4/2009 | Ly et al. | 709/228 |
| 2010/0088370 A1* | 4/2010 | Wu et al. | 709/203 |
| 2011/0047295 A1* | 2/2011 | McCanne et al. | 709/246 |
| 2011/0228776 A1* | 9/2011 | Duncan et al. | 370/390 |

OTHER PUBLICATIONS

PCT Written Opinion for PCT Appln. No. US07/63621; mailed Jul. 28, 2008 (5 pages).

Rodriguez, Pablo, et al., "TPOT: Translucent Proxying of TCP," Feb. 2001; *Computer Communications*, vol. 24, No. 2, pp. 249-255.

Knutsson Bjorn et al., "Transparent Proxy Signalling," 1999, *Journal of Communications and Networks*, ISSN 1229-2370, vol. 3, No. 2, pp. 164-174.

Rodriguez, Pablo, et al., "TPOT: Translucent Proxying of TCP," Feb. 2001; *Computer Communications*, vol. 24, No. 2, pp. 249-255.

* cited by examiner

ADDRESS MANIPULATION TO PROVIDE FOR THE USE OF NETWORK TOOLS EVEN WHEN TRANSACTION ACCELERATION IS IN USE OVER A NETWORK

CROSS-REFERENCE TO RELATED APPLICATIONS

The present disclosure may be related and/or make reference to the following commonly assigned applications/patents:

U.S. Pat. No. 7,120,666 B2, granted on Oct. 10, 2006 and entitled "Transaction Accelerator for Client-Server Communication Systems" to McCanne et al. (hereinafter referred to as "McCanne I");

U.S. patent application Ser. No. 10/640,405, filed Aug. 12, 2003, issued Nov. 29, 2011 as U.S. Pat. No. 8,069,225, and entitled "Transparent Client-Server Transaction Accelerator" to McCanne et al. (hereinafter referred to as "McCanne III");

U.S. patent application Ser. No. 10/640,562, filed Aug. 12, 2003, issued Jan. 8, 2008 as U.S. Pat. No. 7,318,100, and entitled "Cooperative Proxy Auto-Discovery and Connection Interception" to McCanne et al. (hereinafter referred to as "McCanne IV"); and U.S. patent application Ser. No. 11/377,906, filed Mar. 15, 2006 and entitled "Connection Forwarding" to Ly et al. (hereinafter referred to as "Ly").

This application also claims priority from co-pending U.S. Provisional Patent Application No. 60/780,720, filed Mar. 8, 2006 and entitled "Address Manipulation for Network Transparency and Troubleshooting".

The respective disclosures of these applications/patents are incorporated herein by reference in their entirety for all purposes.

FIELD OF THE INVENTION

The present invention relates to networking in general and in particular to network transaction acceleration.

BACKGROUND OF THE INVENTION

Networks often have latency and bandwidth limitations that can be overcome using a number of methods. Some methods include using transaction accelerators. For example, McCanne I, McCanne III and McCanne IV describe how a pair of transaction accelerators can improve performance over a section of a network. In a general example, a client communicates with a server over a network wherein the path of traffic between them, at least in part, travels between transaction accelerators. Thus, a client would be coupled to a client-side transaction accelerator, which would be coupled to a portion of the network, which would be coupled to a server-side transaction accelerator that is in turn coupled to the server. In some instances, the portion of the network between the accelerators is a wide area network (WAN).

Transaction accelerators can cooperate to accelerate client-server transactions across a network. Unless otherwise indicated, it should be understood that the transaction accelerators could operate symmetrically and not need to take into account which of a pair of transaction accelerators is closer to the client and which is closer to the server. The roles of client and server are typically determined by which entity initiated a network connection, with the initiator being labeled the client and the other end being labeled the server. It should also be understood that a transaction accelerator pair might support more than one client and more than one server. While a network path is often described herein as having a transaction accelerator pair in the path, unless otherwise indicated, such description should not be construed as limiting to having only two transaction accelerators in any given path. Also, there are some instances where traffic might pass through one of the transaction accelerators and end up at the other end without having passed through the other transaction accelerator of the pair, however where the first transaction accelerator performs a transformation that is expected to be inverted by the other transaction accelerator, it should pass to the other transaction accelerator if data is to be received at the ultimate destination in a transparent manner.

In a transaction accelerator process, there can be multiple connections, e.g., multiple network connections used to transport data between the client and the server, such as a first network connection between the client and the client-side transaction accelerator, a second network connection between the server and the server-side transaction accelerator and a third connection between the client-side transaction accelerator and the server-side transaction accelerator. The first and second network connections are collectively referred to herein as an "outer connection" and "inner connection" refers to the third network connection. Where the transaction acceleration is transparent to the client and server, the outer connection carries unaccelerated traffic, while the inner connection carries accelerated traffic. This works well where, for example, the transaction accelerators are positioned at WAN-LAN boundaries such that the first and second connections are LAN connections and the third connection (the inner connection) is a WAN connection.

The outer connection can be arranged so that it appears to be a single logical connection from client to server, with its behavior identical to, or substantially similar to, the behavior of a client/server connection without either transaction accelerator present. In that case, the existence of the inner connection is not "visible" to the client or server. As a result, the transaction accelerators can be free to use varied acceleration and optimization methods and techniques for traffic on the inner connection, including dynamically changing techniques, without affecting any aspect of how the client or server is configured.

The accelerated traffic on the inner connection is usually substantially different from the unaccelerated traffic on the outer connection. In particular, the accelerated traffic is often transformed to contain payload data or whole messages that appear entirely different from the original unaccelerated traffic. Since the transformed traffic only needs to flow between transaction accelerators and not directly to a client or server, the inner connection is often most simply and reliably implemented as a simple connection between transaction accelerators and with that, different clients, servers, and/or traffic types can all be treated alike.

However, where the traffic is undifferentiated on the inner connection, network tools (such as network monitoring tools, network processing tools, network debugging tools, etc.) might have trouble if they expect differentiated packets/data/traffic differentiated by client, server, ports, traffic type, etc. For example, some network tools distinguish traffic using network attributes of the client and/or server, such as network address and/or port. Examples of monitoring and processing that such tools can perform include measurement of traffic levels, classification of traffic, enforcement of policies such as Quality of Service (QoS) on traffic, filtering, and access control lists.

Such monitoring or processing can be done normally if it takes place on the outer connection because traffic on the outer connection can be expected to have the same network attributes that client/server traffic would have without transaction accelerators present. However, network tools might not work as well if they are applied to the inner connection, where the traffic looks much different and might not be as differentiated as needed by the network tools. In some instances, it would be desirable to use the network tools on the inner connection as well as the outer connection.

There are some existing approaches to using network tools on transformed traffic. For example, network tools that analyze Netflow information (Netflow was developed by Cisco Systems of San Jose, Calif., USA) can deal with Netflow information about the inner connection provided by transaction accelerators, but that is limited to Netflow-based monitoring.

"Port mapping" can be used to differentiate traffic flows, by partitioning traffic between transaction accelerators into a number of equivalence classes of connections, each of which uses a particular port number. Some port mapping techniques have been developed by Riverbed Technology, of San Francisco, Calif., USA, the current assignee of the present application. Network tools that perform monitoring or processing based on port number can take advantage of port mapping. Port mapping can be used to distinguish among traffic based on non-port attributes, but only by mapping those attributes onto ports. For example, traffic to destination A can be distinguished from traffic to destination B, but only by setting up rules so that traffic to A is sent on port PA while traffic to B is sent on port PB. In addition, the monitoring or processing mechanisms must operate in terms of the ports used, rather than the actual source/destination address information.

Yet another example of an approach is to use a "router transparency mode", such as is provided by products developed by Expand Networks of Roseland, N.J., USA. With a router transparency mode, the original (outer-connection) IP and TCP or UDP headers are reused for packets on the inner connection. While this approach is much more general, and is usable for a wide variety of processing and monitoring mechanisms on the inner connection, the approach only works correctly if 1) the routing system delivers a packet to the counterpart transaction accelerator even though the packet is addressed to another entity (the client or server beyond the counterpart transaction accelerator); and 2) the counterpart transaction accelerator correctly handles the reverse transformation of the packet even though the packet is addressed to another entity. If these conditions are not met, the mode does not work very well.

If routing changes mean that the packet is actually delivered to its stated destination, the resulting problems are hard to troubleshoot, since the packet did not come from its stated source, it was not intended for its stated destination, and it likely contains data that does not match the formats usually communicated on its stated port.

In view of the existing solutions, what was found to be needed are methods and apparatus for a general facility for processing or monitoring traffic and operating other network tools, but providing better characteristics, such as allowing for better troubleshooting characteristics.

BRIEF SUMMARY OF THE INVENTION

In address-manipulation enabled transaction accelerators, the transaction accelerators include source/destination IP addresses and ports from an outer connection ("outer-connection addressing information") in packets emitted over an inner connection (between transaction accelerators), and "inner-connection addressing information", such as inner-connection source/destination IP addresses and ports, is added in packets sent over the inner connection.

In a specific embodiment, the inner-connection addressing information is carried in TCP option fields in each packet. Where TCP options are used for other functions, such as for autodiscovery, they can also be used for address manipulation as described herein if different option numbers are used for different functions.

In another specific embodiment, the inner-connection addressing information is carried directly in other fields, or indirectly through data structures maintained by the endpoints processing the connection. Examples of other fields that can be used for carrying the addressing information include IP options (for either IPv4 or IPv6).

In yet another embodiment, address information can be encoded into header fields originally intended for other purposes but that are unused.

In still another embodiment, address information can be encoded into header fields originally intended for other purposes but that are unused or encoded in used fields, overlaid in combination with other data that is being carried in those used fields. For example, an encoding function may be applied to the TCP sequence number and acknowledgement number fields. Such an encoding may then be decoded on the receiving side to recover the original sequence number, the original acknowledgement number, and the inner-connection addressing information.

The existence of inner-connection addressing information in a packet can be signaled by a flag in the packet, by a bit or other designated encoding. The flag can be in an unused header field or overlaid, as described above.

In variations where replacement and option addition is needed, elements referred to as a "swapper" and an "unswapper" might be used. A swapper exists at the sending side, whereas the receiving side has a counterpart to the swapper called the unswapper. The unswapper detects the TCP option added by the sender's swapper and handles unswapping as needed.

With this arrangement, the client-side transaction accelerator and server-side transaction accelerator can deal entirely with conventional inner-connection addressing; only the swapper and unswapper need deal with substitution of different addresses and ports, allowing for the choice of addressing scheme used on the inner connection to be different for different traffic, even allowing for selection at a packet-by-packet granularity, if that were found to be useful.

The following detailed description together with the accompanying drawings will provide a better understanding of the nature and advantages of the present invention.

DETAILED DESCRIPTION OF THE INVENTION

Figure 1:
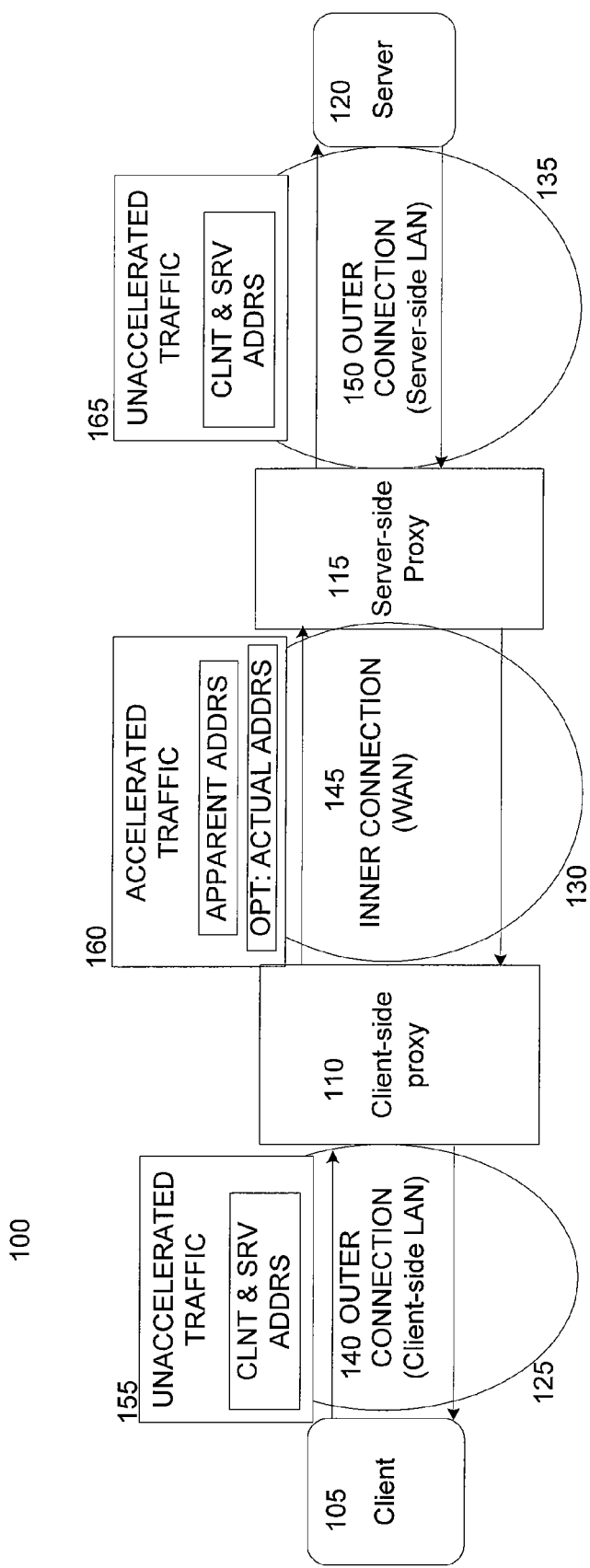
FIG. 1 is a schematic diagram of the typical placement of transaction accelerators in a WAN environment with clients and servers.

Improved methods and apparatus usable with transaction accelerators and network tools are described herein. In address-manipulation enabled transaction accelerators according to aspects of the present invention, the transaction accelerators include source/destination IP addresses and ports from an outer connection ("outer-connection addressing information") in packets emitted over an inner connection (between transaction accelerators), and "inner-connection addressing information", such as inner-connection source/destination IP addresses and ports, is added in packets sent over the inner connection.

The inner-connection addressing information can carried in TCP option fields in each packet, in other fields (used or unused), or is available in data structures maintained by endpoints. Where TCP options are used for other functions, such as for autodiscovery, they can also be used for address manipulation as described herein if different option numbers are used for different functions. The use of TCP options is described in RFC ("Request for Comments") 793, readily available from a compendium of the RFCs, the locations of which are well know to those with skill in the art of networking using the Internet. The use of TCP options for autodiscovery is described in McCanne IV.

The inner-connection addressing information can also be carried directly in other fields or indirectly through data structures maintained by the endpoints processing the connection. Examples of other fields that can be used for carrying the addressing information include IP options fields for either IPv4 or IPv6. The IP options field for IPv4 is described in RFC 791, while the IP options field for IPv6 is described in RFC 2460.

Address information can be encoded into header fields originally intended for other purposes but that are unused or encoded in used fields, overlaid in combination with other data that is being carried in those used fields. For example, an encoding function may be applied to the TCP sequence number and acknowledgement number fields. Such an encoding may then be decoded on the receiving side to recover the original sequence number, the original acknowledgement number, and the inner-connection addressing information.

In general, it cannot be expected that the data of the overlaid field would not be valid for the original purpose of the field and the decoding step is needed to extract the inner-connection addressing information and return the overlaid value of the field to the prior value. Entities that rely on either the overlaid value or the prior value should be positioned so that they get the value in the format they expect, or are configured to deal with any encodings that they encounter.

The existence of inner-connection addressing information in a packet can be signaled by a flag in the packet, by a bit or other designated encoding. The flag can be in an unused header field or overlaid, as described above.

As described above, there are several ways to encode the inner-connection addressing information. In most of the examples that follow, the encoding is assumed to be through the use of the "TCP option", but it should be understood that, unless otherwise indicated, the teachings of the examples would be applicable to one of the other ways to carry inner-connection addressing information and those variations would be apparent to one of ordinary skill in the art after reading this disclosure.

With the use of the TCP option on the inner connection, it is easier to easy to distinguish the inner connection from the outer connection even though the addressing information is identical. Such distinction is often critical to avoid erroneous cases in which one accelerator attempts to accelerate another system's inner-connection traffic, or when a routing loop causes inner-channel traffic to be presented to an accelerator as though it were outer-channel traffic.

Another advantage of using the TCP option is that the transaction accelerator does not need to keep track of NAT changes. That is, the address information required to spoof outer-connection addressing is carried on the TCP option instead of being in data structures maintained by the transaction accelerator. This second advantage may be sacrificed in some embodiments that maintain such data structures. The cost per packet of parsing and processing the addressing details of packets can be lowered if information is maintained in data structures outside the packets. However, that maintained information consumes resources on the device, even when there is little or no traffic on the relevant connection.

Thus, it can be useful to shift the scheme dynamically based on traffic offered and resource availability. For example, a connection may start out using per-packet information, and after passing a threshold amount or rate of traffic, the connection may negotiate a simpler per-packet flag or identifier that maintains addressing information in data structures at the communicating devices, instead of in the packets themselves. Correspondingly, when a communicating device identifies a data structure as underutilized and wants to reclaim it, that device may indicate to its counterpart via the connection that a shift back to per-packet information is required.

The client-side transaction accelerator may still create a connection to the server-side transaction accelerator using the conventional inner-channel addressing mechanism, in terms of the server-side transaction accelerator's address and port. However, for traffic in either direction on the inner channel, the inner-channel source/destination addresses and ports are replaced by the original (outer connection) ones before sending packets on the wire, and a TCP option is added to the header capturing the original inner connection addresses and ports—that is, what would have been used as addresses and ports without the use of this address manipulation.

The element that performs this replacement and option addition is referred to herein as a "swapper"; its counterpart inverse is referred to as an "unswapper". A swapper exists at the sending side, whereas the receiving side has a counterpart to the swapper called the unswapper. The unswapper detects the TCP option added by the sender's swapper and handles unswapping as needed. In one implementation, if the destination address in the TCP option matches the address of the receiving unswapper's transaction accelerator, then the unswapper replaces the addresses and ports in the packet with the addresses and ports in the TCP option. If the destination address in the TCP option does not match the address of the receiving unswapper's transaction accelerator, then the unswapper passes the packet through (it is being sent to a different transaction accelerator).

With this arrangement, the client-side transaction accelerator and server-side transaction accelerator can deal entirely with conventional inner-connection addressing; only the swapper and unswapper need deal with substitution of different addresses and ports. Since the sending side (swapper) can add a TCP option with relevant address information and the receiving side (unswapper) uses that information to rewrite the addresses, then discards the option, the choice of addressing scheme used on the inner connection can be different for different traffic, even allowing for selection at a packet-by-packet granularity, if that were found to be useful.

To avoid a configuration mismatch, the unswapper (receiving-side) should automatically swap inner/outer addresses and ports (and/or other inner vs. outer connection addressing information) when it receives packets with the relevant TCP option, but not perform any swap if the traffic comes without the TCP option.

In the presence of connection forwarding (as described in Ly), the check for the destination IP in the TCP option typically requires additional steps. For example, each unswapper might be associated with at least one transaction accelerator on whose behalf it receives packets and performs the unswapping transformation. A packet is handled by the unswapper if the destination shown in the packet's TCP option is either the unswapper's associated transaction accelerator or an address of a configured neighbor of the associated transaction accelerator. If the packet's TCP option destination indicates a configured neighbor of the receiving transaction accelerator, then the unswapped packet is forwarded to that neighbor. As described in Ly, the actual forwarding can take place by network address translation or by encapsulating the packet. Neither mechanism preserves original (outer-connection) address information between neighbors; so in the presence of connection forwarding, any network monitoring or processing should limit itself to examining only traffic outside the neighbor group.

When connection forwarding is enabled, and is configured to use encapsulation as the forwarding mechanism, inner connections can be opened with a reduced maximum segment size that is chosen to allow the addition of an encapsulating header without causing fragmentation.

Implementation Details of Example Systems

Referring now to the figures, FIG. 1 is a schematic showing a system 100 with a typical arrangement of elements according to aspects of the present invention. Client 105 communicates with server 120 across WAN 130 using client-side proxy 110 and server-side proxy 115. In this diagram, client-side proxy 110 is a separate device from client 105 and communication between them crosses client-side LAN 125. Similarly, server-side proxy 115 is shown as a separate device from server 120 and communication between them crosses server-side LAN 135. However, it is possible for client 105 and client-side proxy 110 to be elements of a single device, in which case the communication between client 105 and client-side proxy 110 will take place on a device's internal communication bus, or as messages or procedure calls between software modules, or any of the other varied inter-device or inter-module communication techniques familiar to those practiced in the arts. It is likewise possible for server 120 and server-side proxy 115 to be elements of a single device, and again the communication between them can take the form of any of the varied inter-device or inter-module communication techniques familiar to those practiced in the arts.

The traffic 155 between client 105 and client-side proxy 110 is unaccelerated and addressed in terms of client 105 and server 120. The traffic 165 between server 120 and server-side proxy 115 is likewise unaccelerated, and addressed in terms of client 105 and server 120. Traffic 155 and traffic 165 are collectively referred to as outer-channel traffic. For any traffic 155 sent by client 105, there must be some causally-related traffic 165 that is identical or substantially similar to traffic 155. Likewise, for any traffic 165 sent by server 120, there must be some causally-related traffic 155 that is identical or substantially similar to traffic 165. Depending on the nature of the transaction acceleration performed by proxies 110 and 115, there also may be additional traffic included in outer channel traffic 155, 165 beyond that which is causally-related to traffic sent by client 105 or server 120.

The traffic 160 between client-side proxy 110 and server-side proxy 115 is accelerated and is referred to as inner-channel traffic. Using conventional techniques, this traffic would be addressed in terms of client-side proxy 110 and server-side proxy 115. When using the address manipulation as described herein, the inner channel traffic 160 is addressed in terms of client 105 and server 120, while a TCP option or similar contains addressing information for client-side proxy 110 and server-side proxy 115.

Figure 2A:
FIG. 2a is a block diagram of an embodiment of the present invention and its context, with components fully separated for clarity.
Figure 2B:
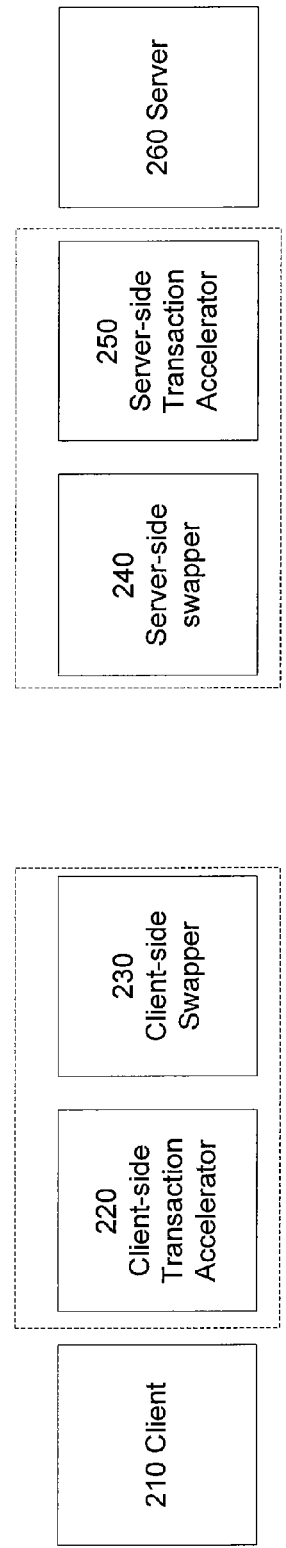
FIG. 2b illustrates one likely packaging of the same components into two transaction accelerator devices.
Figure 2C:
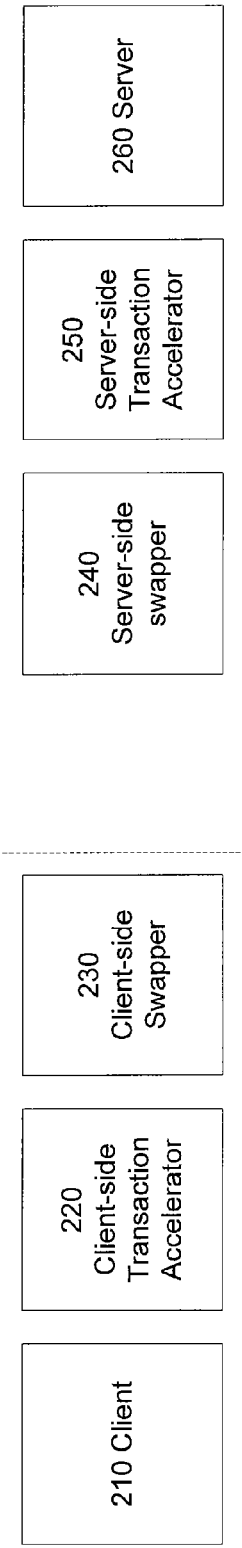
FIG. 2c illustrates two variant packagings, one where all client-side elements coexist with the client and one where the swapper is separated from the transaction accelerator.

FIG. 2 shows various configurations of the elements involved in the system and comprises FIGS. 2a, 2b and 2c. As shown in those figures, a client 210 and a server 260 are sources and sinks for traffic—it should be understood that multiple clients and servers might be handled by the system. Transaction accelerators 220, 250 serve to optimize the traffic passing over the network. Swappers 230, 240 implement address-swapping manipulation that allows the transaction accelerators to communicate in terms of either each other's address or the addresses of client 210 and server 260.

In FIG. 2a, the various elements are shown as distinct entities. Some examples of combinations of these elements into units and/or devices are shown and others should be apparent to those of ordinary skill after reading this disclosure. The elements can be implemented as hardware elements, software elements, firmware elements, etc. and can be standalone elements or implemented as portions of other elements have other related or unrelated functionality. For example, a given element might be a hardware box plugged into one or more network connections and provided with electrical power. As another example, a given element might be implemented as program code that is executed by a processor under electrical power and other elements that the processor interacts with provide network traffic, such as via input/output calls and/or memory accesses.

In FIG. 2b, the transaction accelerator and swapper have been combined into a single device. This is a configuration that would be common for convenience, since both the client-side and the server-side functionality can each now be installed as a single device in the network, shown as client-side device 270 and server side device 280.

In FIG. 2c, the client-side transaction accelerator 220 and client-side swapper 230 are combined with the client 210: this configuration represents a situation where both transaction accelerator 220 and swapper 230 are software elements that were installed (separately or jointly) onto a client machine such as a laptop or desktop computer. Accordingly the client-side device 290 encompasses all three client-side elements.

On the server side of FIG. 2c, the server-side swapper 240 is a separate device from the server-side transaction accelerator 250. Such a configuration represents a situation where the swapper functionality is implemented in a device (such as a router or load balancer) different from where the transaction accelerator functionality is implemented. Such separation can allow for larger scale as more resources are brought to bear on each different function, as well as allowing hierarchies or cascades of devices to implement a single logical function.

FIG. 3 illustrates examples of transformations among addressing. The techniques embodied in what is illustrated are useful in both directions, can be applied to many different connections, and can be dynamically enabled or disabled. For clarity, FIG. 3 illustrates a single direction, a single connection, with the transformation statically enabled, but other variations should be apparent after reading this disclosure.

The small elements in FIG. 3 represent some of the same objects that appear in FIG. 2. For example "CA" is a client-side accelerator, "CS" is a client-side swapper, "SS" is a server-side swapper, and "SA" is a server-side accelerator. Clients and servers are not shown in the figure, so as not to distract from what is illustrated and to make clearer the inner connection behaviors. An additional element appearing in FIG. 3 that is not found in FIG. 2 is "XS" for a miscellaneous unrelated swapper (that is, the "X-side swapper"), and "XA" for its associated transaction accelerator (the "X-side accelerator," that is, the accelerator on behalf of which the XS is potentially changing header information).

Figure 3A:
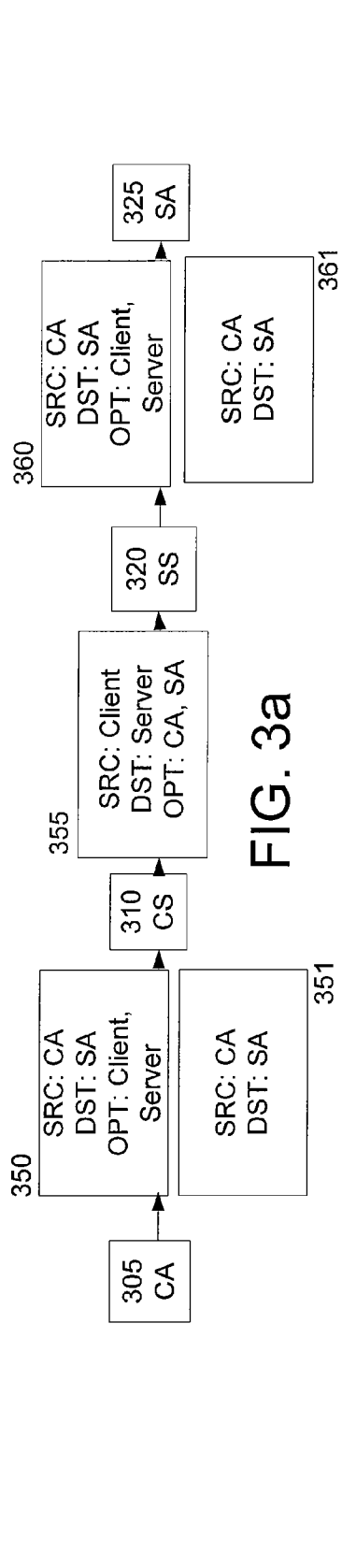
FIG. 3a illustrates transformation of addressing in a simple case.

FIG. 3a shows a simple case, with message 350 being sent from CA 305 to SA 325. The first step takes message 350 from CA 305 to CS 310. Message 350 includes client and server information in a TCP option field of the header, but such an approach is not required. Message 351 is an alternative approach, where the header contains only the original source/destination information (in terms of CA and SA) and the client/server address information is supplied in some other message or shared data. CS 310 produces a message 355 that carries the same payload information as message 350, but has different source/destination information. Instead of the information using the address of CA 305 and SA 325, the source is now the client and the destination is the server. The addresses of CA 305 and SA 325 are included in message 355 by embedding them in a TCP option, indicated as "OPT:".

When this message 355 is received at SS 320, it is processed to produce message 360 by swapping the addresses in the TCP option for the source and destination. Alternatively, the original client/server address information can be discarded as shown in message 361. Message 351 and message 361 are identical, or substantially similar. If swappers 310, 320 are absent, disabled, or simply configured to not perform the transformation to and from message 355, the communicating accelerators 305, 325 still see the same traffic. So, the communication arrangements from CA 305 to SA 325 are unchanged regardless of whether the swappers 310, 320 are present or not, and whether they are operational or not.

Figure 3B:
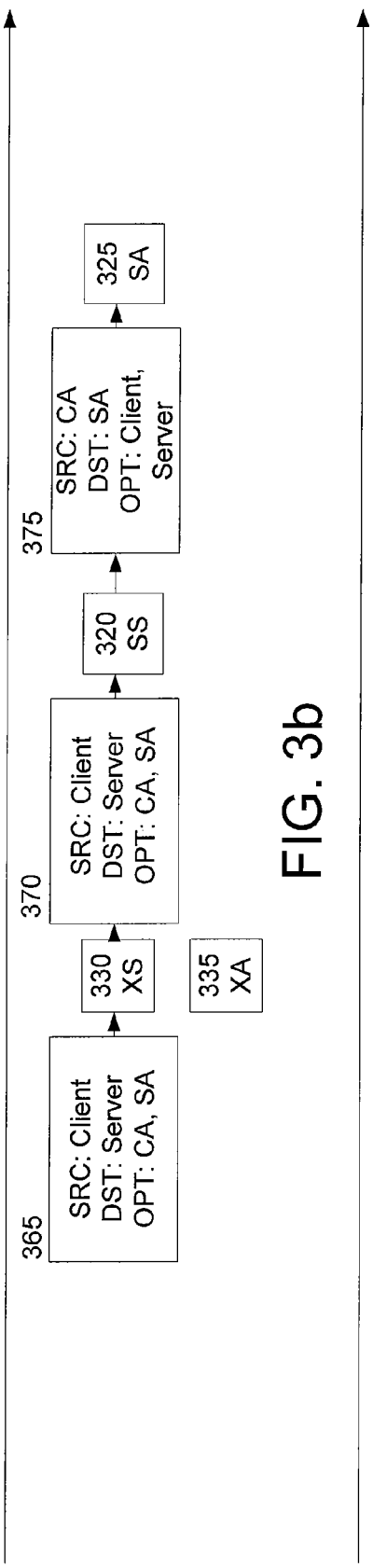
FIG. 3b illustrates transformation of addressing in a more complex case.

FIG. 3b shows a case where a swapper does not perform the transformation. The CA and CS elements do not appear in this diagram, as it is directed to correctly handling a received message. Message 365 is received at XS 330 which has associated accelerator XA 335. Because message 365 is neither addressed to XA 335, nor does its TCP option field contain an appropriate address for XA 335, XS 330 does not perform any change to it. Thus, message 370 is identical or substantially similar to message 365. When message 370 is received by SS 320, the address in the TCP option does match the address of SA 325. As a result, SS 320 does perform the same substitution that was described for FIG. 3a to produce message 375. Although only one form of the transformed message is shown, all the variations described in FIG. 3a are equally applicable to the scenario shown in FIG. 3b. There may be many intermediate but unaffected entities such as XS 330 and XA 335 between the original source (not shown in this picture) and the actual destination (implemented by SS 320 and SA 325).

Figure 3C:
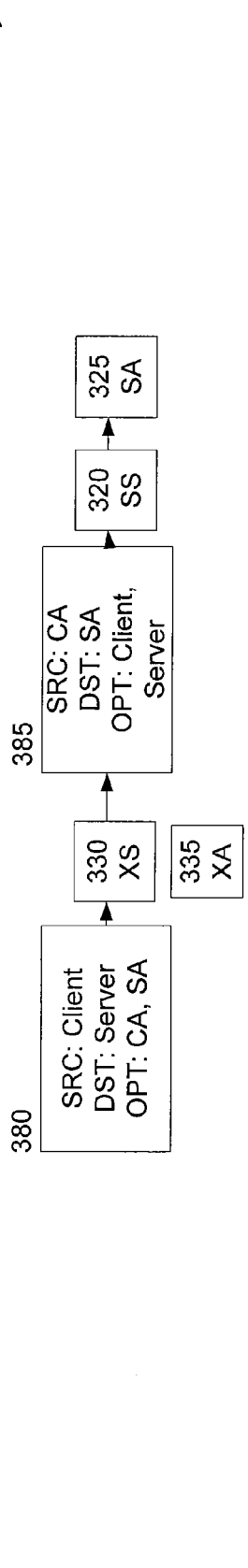
FIG. 3c illustrates transformation of addressing in another more complex case.

FIG. 3c shows a case where a swapper performs the transformation even though the message is not addressed to its associated accelerator. Message 380 is received at XS 330, and as in FIG. 3b message 380 is neither addressed to XA 335, nor does its TCP option field contain an appropriate address for XA 335. However, in this case XA 335 and SA 325 (and possibly other additional accelerators not depicted here) are configured as a connection forwarding neighbor group as described in Ly, and the TCP option field of message 380 does contain an appropriate address for SA 325. So XS 330 performs the swapping transformation (or its variants as described in FIG. 3a), producing message 385 that can be forwarded to SA 325 using any of the techniques described by Ly. Although the figure shows the message 385 passing through SS 320 before reaching SA 325, it is not necessary for SS 320 to handle the forwarded message, and if there is a direct path to SA 325 it is possible for the forwarded message to follow that path instead.

Figure 4:
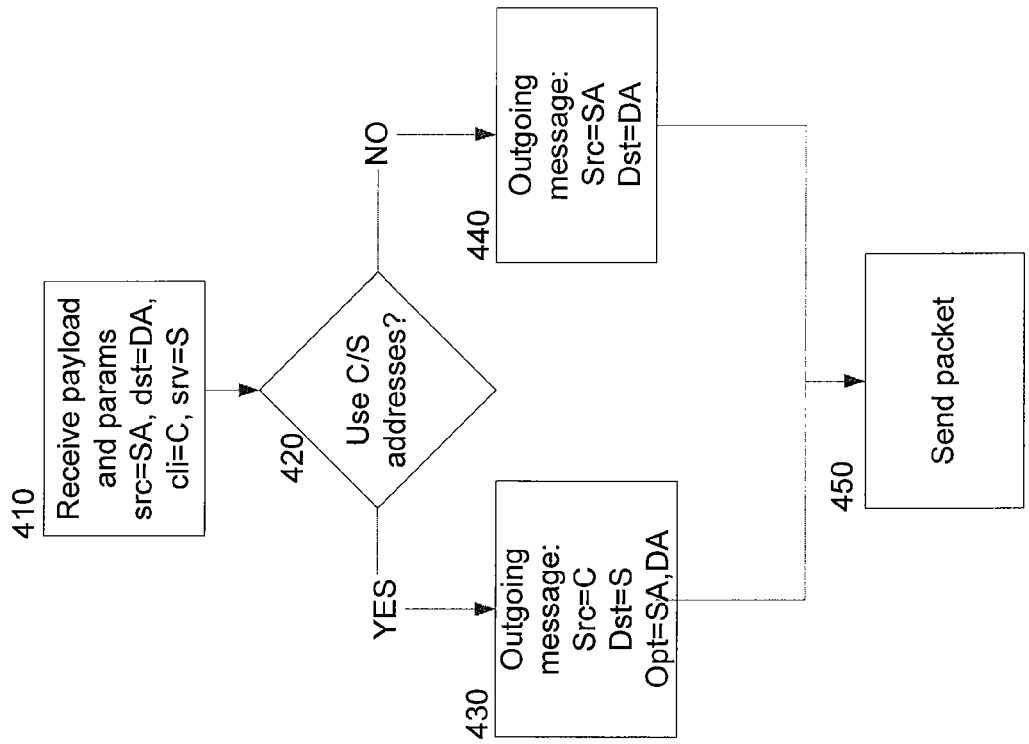
FIG. 4 is a flow diagram of processing on the sending side, both with and without address manipulation enabled.

FIG. 4 shows the sending-side logic for the transformation. The sending side (which was depicted as the client side in all the examples of FIG. 3, and which we likewise take to be on the client side for FIG. 4) simply chooses whether or not to apply the transformation. In step 410, a message to be sent out is received with a payload to be carried (not considered further), inner connection address information (a source accelerator SA and a destination accelerator DA), and the client C and server S addresses being used on the outer connection. In step 420, a choice is made about whether to use the outer-connection addresses on the inner connection. This choice may be determined by configuration settings, versions of software in use, computations performed on the traffic being optimized, or any of the other ways to determine traffic policies that are known to those practiced in the arts. If the outer-connection addresses are to be used on the inner connection, processing goes to step 430 where the outgoing message uses the outer connection addresses and adds the inner connection addresses to a TCP option. If, instead, the inner connection is to use inner connection addresses, then processing goes to step 440 which simply uses the inner connection addresses and does not add any TCP option. In either case, the resulting message is sent in step 450.

Figure 5:
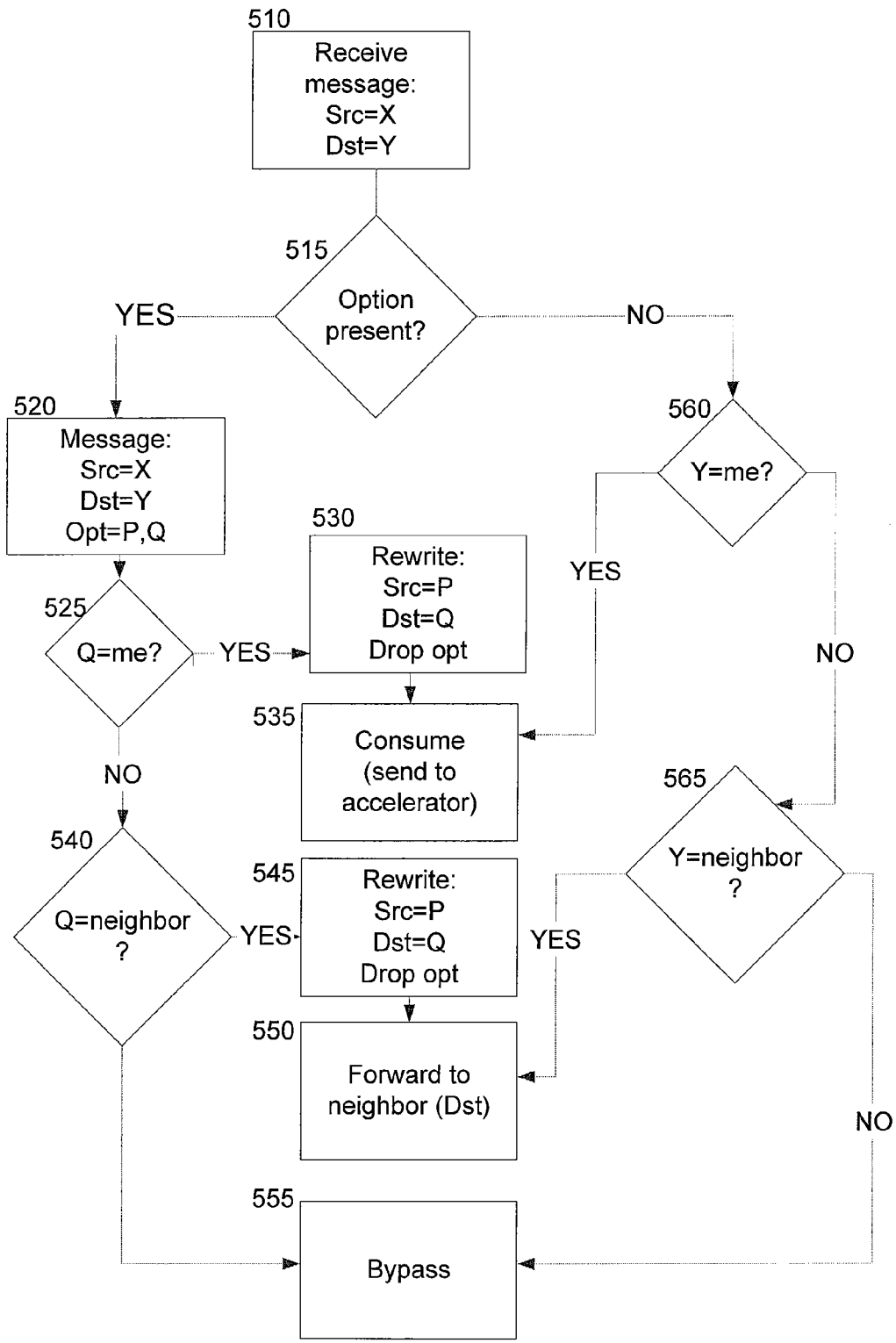
FIG. 5 is a flow diagram of processing on the receiving side, both with and without address manipulation enabled.

FIG. 5 shows the processing that takes place at a receiver. The processing of each message starts with receipt of a message at step 510 and ends with a message being either sent to the associated accelerator (step 535) or forwarded to a neighbor accelerator (step 550) or bypassed (step 555). When a message is bypassed, the message is given in identical or substantially similar form to whatever downstream entity would receive it in the absence of the receiver.

In step 515, the message is examined to determine whether a TCP option is present. If so, then processing moves to step 520 in which the content of the option is parsed to discover the destination address Q that is in the TCP option. In step 525 the address Q is compared to the address of the associated accelerator. If there is a match, the message is rewritten in step 530 to swap the addresses in the TCP option into the source and destination fields, then the rewritten message is sent to the associated accelerator in step 535.

If there is no match in step 525, the processing moves to step 540 where address Q is compared to the neighbor accelerators that are configured for connection forwarding as described in Ly. If Q is the address of a connection forwarding neighbor, the message is rewritten in step 545 to swap the addresses in the TCP option into the source and destination fields, then the rewritten message is sent to the neighbor accelerator in step 550 using any of the forwarding techniques described by Ly.

If there was no match in step 540, then this message is not to be handled by this receiver. Instead, the processing moves to step 555, which causes the message to be sent on to whatever the downstream network entity is.

The remaining steps in the figure cover processing related to connection forwarding. In step 560, there is a comparison between the message's destination Y and the associated accelerator. If there is a match, then the message is sent to the associated accelerator in step 535. If there is no match, then in step 565 the message's destination Y is compared to the neighbor accelerators that are configured for connection forwarding as described in Ly. If Y is the address of a connection forwarding neighbor, the message is sent to the neighbor accelerator in step 550 using any of the forwarding techniques described by Ly. If there was no match in step 565, then this message is not to be handled by this receiver. Instead, the processing moves to step 555, which causes the message to be sent on to whatever the downstream network entity is.

While the invention has been described with respect to exemplary embodiments, one skilled in the art will recognize that numerous modifications are possible. For example, the processes described herein may be implemented using hardware components, software components, and/or any combination thereof Thus, although the invention has been described with respect to exemplary embodiments, it will be appreciated that the invention is intended to cover all modifications and equivalents within the scope of the following claims.

What is claimed is:

1. A method of sending through a network a message that includes payload information, a value of a source address, a value of a destination address, and one or more particular fields for storing data values, the method comprising:
   (a) intercepting at a source network proxy, a first message from a client to a server in the network, wherein the value of the source address included in the first message is a client address and the value of the destination address included in the first message is a server address;
   (b) creating a second message that includes the payload information from the first message, the second message sent from the source network proxy to a destination network proxy;
   (c) processing the second message at a first address swapper operating in cooperation with the source network proxy, the processing comprising:
   (d) storing first data within the one or more particular fields of the second message; wherein at least one of a source network proxy address and a destination network proxy address are stored within a TCP option field;
   (e) storing within the second message an indication that the first data is stored within the second message; and
   (f) establishing, in the second message, the server address as the value of the destination address and the client address as the value of the source address included in the second message;
   (g) sending the second message over the network, wherein the network delivers the message based on the destination address included in the second message;
   (h) intercepting the second message by a second address swapper associated with the destination network proxy;
   (i) processing the second message by the second address swapper, the processing comprising:
      (1) retrieving the source network proxy address and the destination network proxy address from the first data stored within the one or more particular fields of the second message;
      (2) establishing the destination network proxy address as the value of the destination address and the source network proxy address as the value of the source address included in the second message;
   (j) receiving the second message at the destination network proxy;
   (k) creating a third message by the destination network proxy that includes the payload information of the second message; and
   (l) delivering the third message to the server.

2. The method of claim 1, further comprising:
   (m) receiving, at the second address swapper, a response to the third message, wherein the response is a first response message addressed to the source network proxy from the destination network proxy;
   (n) creating a second response message that includes the payload information from the first response message, the second response message sent from the destination network proxy to the source network proxy;
   (o) processing the second response message at the second address swapper, the processing comprising:
      (1) storing second data within the one or more particular fields of the second response message; wherein the second data comprises the source network proxy address and the destination network proxy address; and
      (2) establishing, in the second response message, the client address as the value of the destination address and the server address as the value of the source address included in the second response message;
   (p) sending the second response message over the network, wherein the network delivers the message based on the destination address included in the second response message;
   (q) intercepting the second response message by the first address swapper;
   (r) processing the second response message by the first address swapper, the processing comprising:
      (1) retrieving the source network proxy address and the destination network proxy address from the second data stored within the one or more particular fields of the second response message;
      (2) establishing the source network proxy address as the value of the destination address and the destination network proxy address as the value of the source address included in the second response message;
   (s) receiving the second response message at the source network proxy;
   (t) creating a third response message by the source network proxy that includes the payload information of the second response message; and
   (u) delivering the third response message to the client.

3. The method of claim 1, wherein the source network proxy and the destination network proxy are proxies configured to promote transaction acceleration.

4. The method of claim 1, wherein
   the one or more particular fields of the second message comprises a TCP option field.

5. The method of claim 1, wherein
   the one or more particular fields of the second message comprises an IP option field.

6. The method of claim 1, wherein storing the first data in the one or more particular fields of the second message further comprises storing within the second message an indication that the first data is stored within the second message.

7. The method of claim 2, wherein:
   the first message, the second message, and the third message are three variations of a common message; and
   the first response message, the second response message, and the third response message are three variations of a common response.

8. The method of claim 6, further comprising removing the indication that the second data is stored within the second message.

9. A method of providing transparent network addressing for proxied network traffic between a first endpoint and a second endpoint comprising:

associating a first transport connection with a second transport connection, wherein endpoints of the first transport connection comprise the first endpoint and a first proxy, and the first transport connection carries unaccelerated traffic;

wherein endpoints of the second transport connection comprise the first proxy and a second proxy, and the second transport connection carries accelerated traffic;

sending first packets from the first endpoint over the first transport connection, the first packets addressed to the second endpoint;

intercepting at the first proxy the first packets addressed to the second endpoint;

sending second packets based on the first packets from the first proxy over the second transport connection, the second packets addressed to the second proxy;

prior to receiving the second packets addressed to the second proxy:

(1) determining a source address and a destination address of the first transport connection; and (2) modifying the second packets to create third packets based on the second packets, the third packets addressed to the destination address of the first transport connection;

intercepting at the second proxy the third packets addressed to the destination address of the first transport connection;

modifying the third packets to create fourth packets based on the third packets, the fourth packets addressed to the second endpoint;

sending the fourth packets addressed to the second endpoint.

10. The method of claim 9, further comprising recording, in at least one packet transmitted over the second transport connection, prior to transmitting the second packets from the first proxy, an indication of the source and destination ports of the first transport connection.

11. The method of claim 9, further comprising recording, in at least one packet of the second packets transmitted over the second transport connection, an indication of the source and destination network addresses of the second transport connection, wherein the indication is at a location in the packet header exclusive of the source and destination address fields.

12. The method of claim 11, further comprising recording, in at least one packet of the second packets transmitted over the second transport connection, an indication of the source and destination ports of the first transport connection.

* * * * *